(12) United States Patent
Kaiser et al.

(10) Patent No.: US 9,847,704 B2
(45) Date of Patent: Dec. 19, 2017

(54) ROTOR ASSEMBLY AND METHOD OF MANUFACTURE FOR ELECTRIC MACHINES HAVING MULTIPLE MAGNET LENGTHS

(71) Applicant: GM GLOBAL TECHNOLOGY OPERATIONS LLC, Detroit, MI (US)

(72) Inventors: Edward L. Kaiser, Orion, MI (US); Peter J. Savagian, Bloomfield Hills, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 14/932,590

(22) Filed: Nov. 4, 2015

(65) Prior Publication Data

US 2016/0248286 A1 Aug. 25, 2016

Related U.S. Application Data

(60) Provisional application No. 62/118,157, filed on Feb. 19, 2015.

(51) Int. Cl.
*H02K 21/12* (2006.01)
*H02K 15/03* (2006.01)
*H02K 1/27* (2006.01)
*H02K 1/24* (2006.01)

(52) U.S. Cl.
CPC .......... *H02K 15/03* (2013.01); *H02K 1/2766* (2013.01); *H02K 1/246* (2013.01)

(58) Field of Classification Search
CPC ......... Y10T 29/49012; Y10T 29/49009; Y10T 29/49078; H02K 15/03; H02K 1/2766; H02K 1/246
USPC ............ 310/156.08, 156.51, 156.53, 156.56, 310/216.04, 216.113, 216.015, 216.016; 29/596, 598
See application file for complete search history.

(56) References Cited

U.S. PATENT DOCUMENTS

| | | | | |
|---|---|---|---|---|
| 4,354,126 A * | 10/1982 | Yates | ................... | H02K 1/2773 310/156.59 |
| 6,727,628 B2 * | 4/2004 | Shimada | .................. | H02K 1/30 310/156.53 |
| 2009/0174273 A1 * | 7/2009 | Watanabe | .............. | H02K 15/03 310/156.53 |
| 2012/0222289 A1 * | 9/2012 | Nagai | .................... | H02K 1/276 29/598 |
| 2013/0002082 A1 * | 1/2013 | Utsumi | .................. | H02K 1/276 310/156.53 |
| 2013/0038163 A1 * | 2/2013 | Kim | ...................... | H02K 1/276 310/156.16 |

* cited by examiner

*Primary Examiner* — Thanh Lam
(74) *Attorney, Agent, or Firm* — Quinn IP Law (57) ABSTRACT

An improved rotor assembly configured for magnets with differing lengths, and methods and systems for manufacturing the same. The rotor assembly may be created by selectively creating first and second tabs extending into apertures of lamination sheets. The first and second tabs may be selectively removed, depending on the different magnet lengths and the specific lamination sheet, according to one of a first finishing schedule and a second finishing schedule. The lamination sheets are stacked with any remaining first and second tabs, and other features, aligned.

9 Claims, 5 Drawing Sheets

ROTOR ASSEMBLY AND METHOD OF MANUFACTURE FOR ELECTRIC MACHINES HAVING MULTIPLE MAGNET LENGTHS

CROSS-REFERENCE TO RELATED APPLICATIONS

This application claims the benefit of U.S. Provisional Application No. 62/118,157, filed Feb. 19, 2015, which is hereby incorporated by reference in its entirety.

TECHNICAL FIELD

This disclosure generally relates to internal permanent magnet electric machines and, more particularly, to a rotor assembly for the internal permanent magnet machine.

BACKGROUND

An electric motor uses electric potential energy to produce mechanical energy through the interaction of magnetic fields and current-carrying conductors. The reverse process, using mechanical energy to produce electrical energy, is accomplished by a generator or dynamo. Other electric machines, such as motor/generators, combine various features of both motors and generators.

Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

SUMMARY

An improved method, structure, or system for creating internal permanent magnet rotors is provided. The system selectively creates rotor assemblies for at least two different magnet lengths by selectively creating tab retention and recess features in lamination sheets of the rotors. The rotor assembly may be created by selectively creating first and second tabs extending into apertures of lamination sheets. The first and second tabs may be selectively removed, depending on the different magnet lengths and the specific lamination sheet, according to one of a first finishing schedule and a second finishing schedule. The lamination sheets are stacked with any remaining first and second tabs, and other features, aligned.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
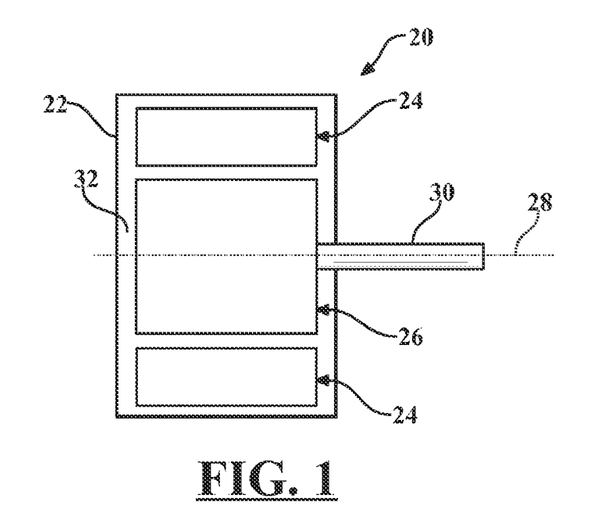
FIG. 1 is a schematic, diagrammatic view of an electric machine.

Referring to the drawings, wherein like reference numbers correspond to like or similar components whenever possible throughout the several figures, there is shown in FIG. 1 an electric machine 20, which may be referred to as an interior permanent magnet electric machine 20. Referring to FIG. 1, the electric machine 20 includes a housing 22 supporting a stator assembly 24. A rotor assembly 26 is rotatably attached to the housing 22 for rotation about a longitudinal or central axis 28 relative to the housing 22 and the stator assembly 24.

A shaft 30 is attached to the rotor assembly 26 for rotation with the rotor assembly 26 about the central axis 28. As shown, the rotor assembly 26 is disposed within a central opening 32 of the stator assembly 24, and is concentric with the stator assembly 24 about the central axis 28. While FIG. 1 depicts a typical electric machine 20, it will be appreciated that the electric machine 20 may be configured in some other manner, such as for example with the rotor assembly 26 disposed annularly outside an outer periphery of the stator assembly 24. Accordingly, the scope of the claims is not limited to the specific configuration of the electric machine 20 shown and described herein.

While the present invention may be described with respect to specific applications or industries, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Figure 2:
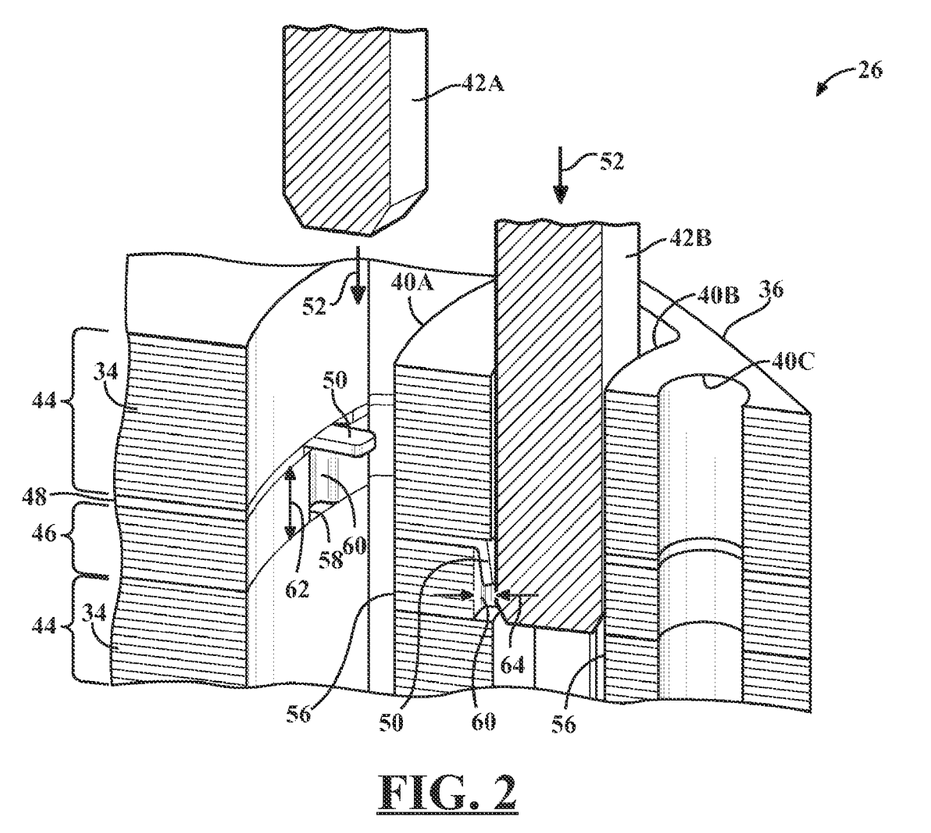
FIG. 2 is a schematic, partially exploded, fragmentary cross sectional view of a rotor assembly of an electric machine, such as that shown and described in FIG. 1.
Figure 3:
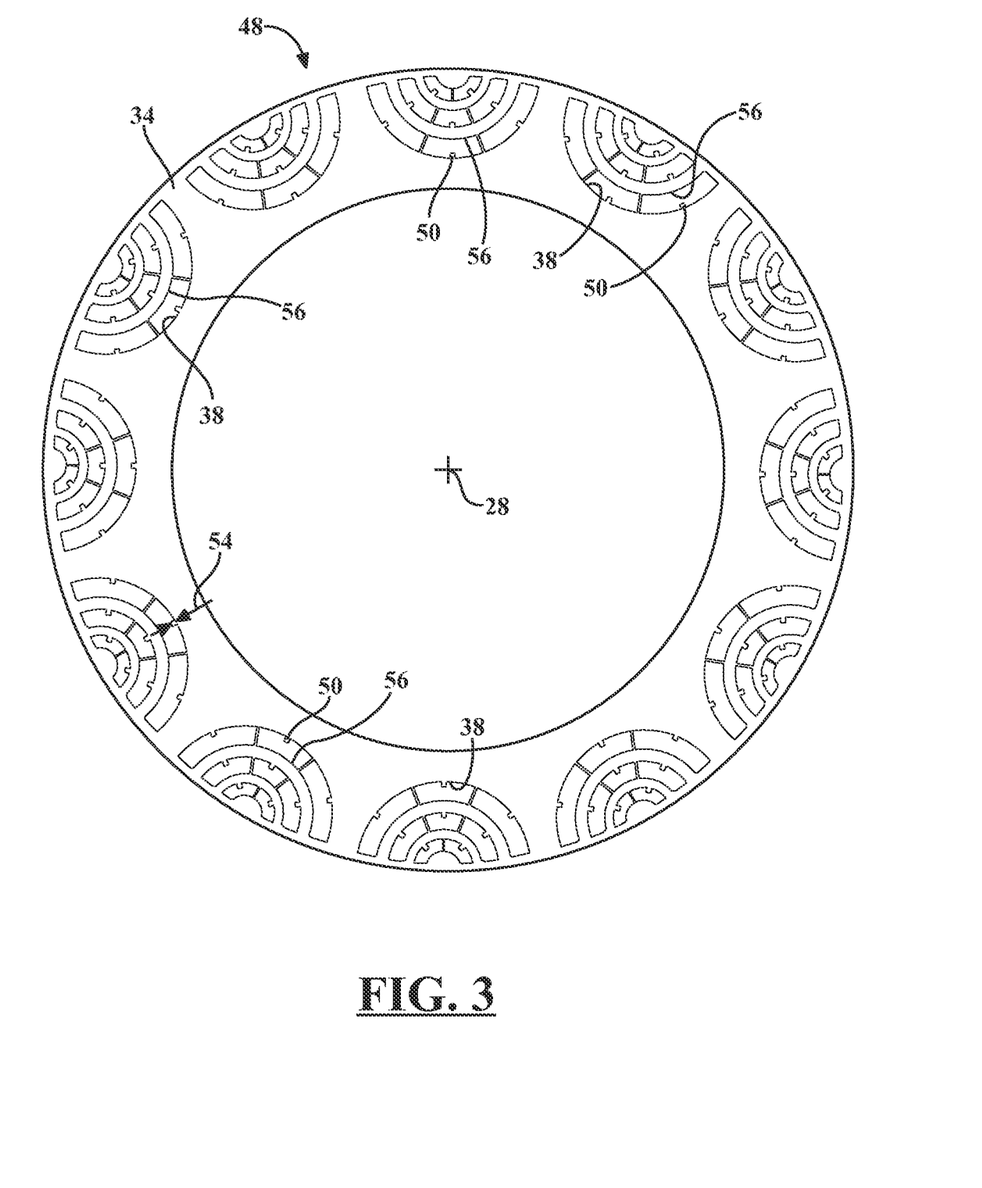
FIG. 3 is a schematic plan view of a laminated sheet for a rotor assembly, such as those usable with the electric machine shown and described in FIG. 1 and FIG. 2.

Referring to FIGS. 2 and 3, the rotor assembly 26 includes a plurality of lamination sheets 34. Each of the lamination sheets 34 is preferably manufactured from steel, such as but not limited to non-orientated electrical steel. The lamination sheets 34 are disposed adjacent each other along the central axis 28 to define a laminated stack 36, shown in FIG. 2. The laminated stack 36 forms a core of the rotor assembly 26.

The lamination sheets 34 are concentrically aligned along the central axis 28 to form the laminated stack 36.

As best shown in FIG. 3, each of the lamination sheets 34 defines at least one, and preferably a plurality of apertures 38. A aperture punch may be used to form the apertures 38. Referring to FIG. 2, when the lamination sheets 34 are aligned along the central axis 28 and relative to each other, the plurality of apertures 38 in the lamination sheets 34 is aligned with each other to define a plurality of slots 40. The slots 40 extend parallel with the central axis 28. The slots 40 are generally referred to by reference numeral 40. A first slot is specifically referred to by reference numeral 40A, a second slot is specifically referred to as 40B, and a third slot is specifically referred to as 40C.

As shown in FIG. 2, the rotor assembly 26 includes a plurality of magnets 42. One of the plurality of magnets 42 is disposed within each of the plurality of slots 40. The magnets 42 are generally referred to by reference numeral 42. A first magnet 42 is specifically referred to by reference numeral 42A, and a second magnet 42 is specifically referred to as 42B. The magnet 42 of each slot 40 is sized and shaped to fit within its respective slot 40. Accordingly, if the slot 40 includes a curved cross sectional shape perpendicular to the central axis 28, then the magnet 42 includes a corresponding curved cross sectional shape perpendicular to the central axis 28 so as to fit within the slot 40. It should be appreciated that the slots 40 and their respective magnets 42 may be formed to include curved cross sectional shapes or rectangular cross sectional shapes relative to the central axis 28. The magnets 42 may include, but are not limited to, ferrite magnets 42 or rare earth magnets 42, such as NdFeB.

Referring to FIG. 2, the plurality of lamination sheets 34 includes at least one group of standard lamination sheets 44, at least one group of recess lamination sheets 46, and at least one tab lamination sheet 48. Accordingly, it should be appreciated that the group of standard lamination sheets 44 include a plurality of standard lamination sheets 44 grouped or stacked together, such as by a stacking mechanism, with each of the lamination sheets 34 disposed within the group of standard lamination sheets 44 being substantially identical. The group of recess lamination sheets 46 includes a plurality of recess lamination sheets 46 grouped or stacked together, with each of the lamination sheets 34 disposed within the group of recess lamination sheets 46 being substantially identical. The tab lamination sheet 48 is disposed between the group of standard lamination sheets 44 and the group of recess lamination sheets 46.

The rotor assembly 26 may include multiple groups of standard lamination sheets 44, multiple groups of recess lamination sheets 46, with multiple tab lamination sheets 48, arranged in an alternating relationship. As such, an individual tab lamination sheet 48 is disposed between one group of standard lamination sheets 44 and one group of recess lamination sheets 46. Furthermore, the combination of one tab lamination sheet 48 and one group of recess lamination sheets 46 may be referred to as a laminated retention system. The rotor assembly 26 may include multiple laminated retention systems throughout the laminated stack 36, with each laminated retention system separated by one group of standard lamination sheets 44.

While the rotor assembly 26 may include multiple laminated retention systems, the detailed description below relates only to a single laminated retention system. It should be appreciated that the description below applies to all of the laminated retention systems within the rotor assembly 26. As noted above, the laminated retention system includes one tab lamination sheet 48 and one group of recess lamination sheets 46. The tab laminated sheet 48 includes a plurality of tabs 50. At least one of the plurality of tabs 50 extends into each of the plurality of apertures 38 of the respective tab lamination sheet 48, and thereby into each of the plurality of slots 40 of the rotor assembly 26. Each tab 50 extends into abutting engagement with the magnet 42 disposed within the respective slot 40 of the tab 50.

The tab lamination sheet 48 is initially formed such that the tab 50 is coplanar with the tab lamination sheet 48, and extends radially outward from the central axis 28 once installed in the laminated stack 36. The initial position of a tab 50 is shown in FIG. 2 in the first slot 40A. The magnets 42 of the respective slots 40 are axially inserted parallel with the central axis 28 into their respective slots 40, from an axial end, i.e., an insertion end, of laminated stack 36. The direction of insertion of the magnets 42 is generally indicated by the direction arrow 52. As the magnets 42 are inserted into the slots 40, the magnets 42 contact the tabs 50 within their respective slots 40, and bend the tabs 50 out of their way. In so doing, the tabs 50 are bent to an approximately parallel relationship relative to the slots 40 and the central axis 28. The final, bent position of a tab 50 is shown in FIG. 2 in the second slot 40B.

As shown in the first slot 40A, the tab 50 thereof includes a radial length 54 measured radially relative to the central axis 28. The tab 50 of the first slot 40A, prior to insertion of the first magnet 42A, extends into the first slot 40A a distance that is equal to the radial length 54. Preferably, the radial length 54 of the tabs 50 is between the range of 1 mm and 3 mm. However, it should be appreciated that the radial length 54 of the tabs 50 may vary from the exemplary embodiment. Furthermore, the radial length 54 of the tabs 50 may vary based on the specific size, shape and configuration of the slots 40 and their respective magnets 42.

Because the tabs 50 are bent during insertion of the magnets 42 into the slots 40, the tabs 50 act as a spring to bias their respective magnets 42 against an opposing wall 56 of their respective slots 40. The tabs 50 bias the magnets 42 against the wall 56 to secure the respective magnet 42 in position relative to the laminated stack 36. Preferably, the tabs 50 bias their respective magnets 42 toward a radially outer wall 56 of the slot 40 relative to the central axis 28. However, it should be appreciated that the tabs 50 may be positioned relative to the slot 40 to bias the magnets 42 toward some other radially positioned wall 56 of the slot 40. Because the tabs 50 bias the magnets 42 against the wall 56 of the laminated stack 36 to secure the position of the magnets 42 relative to the laminated stack 36, the rotor assembly 26 does not require any adhesive for bonding the magnets 42 to the laminated stack.

Referring to FIG. 3, each of the plurality of apertures 38 of each of the recess lamination sheets 46 includes a groove portion 58. Referring to FIG. 2, each of the recess lamination sheets 46 are stacked adjacent to each other such that the groove portions 58 of each respective recess lamination sheet 46 are disposed adjacent each other to define a plurality of grooves 60 extending parallel with the central axis 28. One of the plurality of grooves 60 is disposed within each of the plurality of slots 40, adjacent and directly behind the respective tab 50 of the slot 40, relative to the direction of insertion of the magnets 42.

After insertion of the magnets 42 within their respective slots 40, each tab 50 of the tab lamination sheet 48 is at least partially disposed within the respective groove 60 of the slot 40 defined by the recess lamination sheets 46. Each groove 60 defines a longitudinal length 62 measured parallel with the central axis 28. The longitudinal length 62 of the groove 60 is greater than the radial length 54 of the tab 50, so that when each tab 50 is bent into its final position, the tab 50 does not bind between the slot 40 and the magnet 42 and prevent insertion of the magnet 42 into its respective slot 40.

The grooves 60 are recessed into the laminated stack 36 from their respective slots 40 at least a recess distance 64. The lamination sheets 34 and the tabs 50 include a thickness measured parallel with the central axis 28. The recess distance 64 is preferably equal to or greater than a thickness of the lamination sheets 34. Preferably, the lamination sheets 34 and the tabs 50 include a thickness measured parallel with the central axis 28 that is between the range of 0.25 mm and 0.5 mm. Preferably the recess distance 64 that the grooves 60 are recessed from the slots 40 is equal to or greater than 0.25 mm. However, it should be appreciated that the thickness of the lamination sheets 34 and the tabs 50, and the recess distance 64 of the grooves 60, may vary.

Figure 4A:
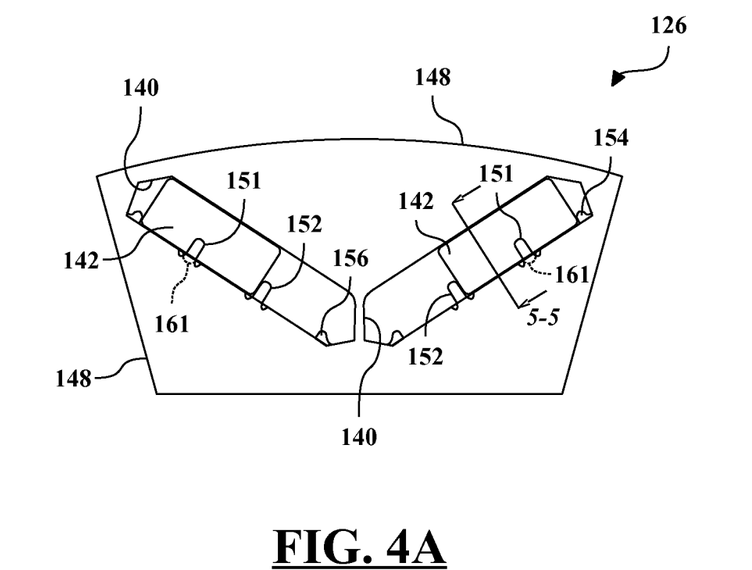
FIG. 4A is a schematic plan view of a portion of a laminated sheet for a rotor assembly configured for multiple magnet lengths, and illustrated a short magnet.
Figure 4B:
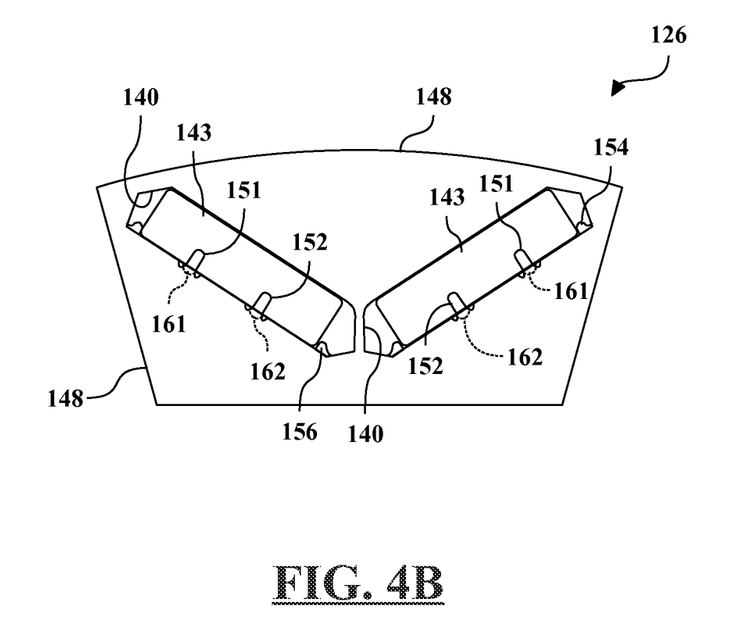
FIG. 4B is a schematic plan view of a laminated sheet related to that shown in FIG. 4A, configured with a long magnet.
Figure 5:
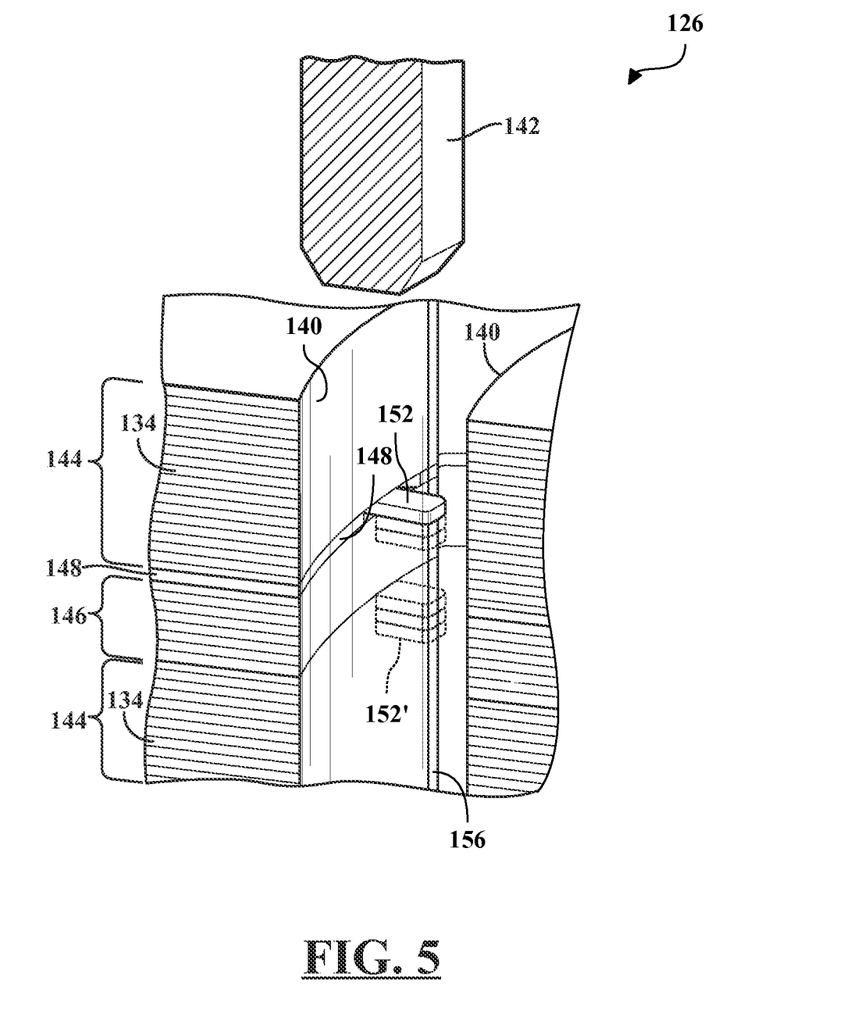
FIG. 5 is a schematic, partially-exploded, fragmentary cross sectional view of the rotor assembly configured for multiple magnet lengths.

Referring now to FIG. 4A, to FIG. 4B, and to FIG. 5, and with continued reference to FIGS. 1-3, there are shown several views and configurations of a rotor assembly 126, which is an IPM rotor configured to be produced with multiple magnet lengths depending on changes to a common stamping tool. The rotor assembly 126 shares many features with the rotor assembly 26, and description of shared features and functions may be omitted from the description of the rotor assembly 126.

FIG. 4A shows a plan view of a portion of the rotor assembly 126, illustrating configuration for short magnets. FIG. 4B shows a plan view of a portion of the rotor assembly 126, illustrating configuration for long magnets. FIG. 5 shows a partially-exploded, isometric view similar to the portion of the rotor assembly 126 shown in FIG. 4A.

The rotor assembly 126 includes a plurality of lamination sheets 134. Each of the lamination sheets 134 may be manufactured from steel, such as but not limited to non-orientated electrical steel. The lamination sheets 134 are disposed adjacent each other along a central axis (not shown) to define a laminated stack 136, as shown in FIG. 5. The laminated stack 136 forms a core of the rotor assembly 126. The lamination sheets 134 are concentrically aligned along the central axis to form the laminated stack 136.

The lamination sheets 134 define at least one aperture (not separately numbered), and preferably a plurality of apertures, which may be created or formed by an aperture punch. When the lamination sheets 134 are assembled and aligned along the central axis, the apertures in the lamination sheets 134 are aligned with each other to define one or more slots 140, which extend parallel with the central axis. Only one of the slots 140 is illustrated in FIG. 5.

The rotor assembly 126 includes a plurality of magnets, one or more of which is disposed within each of the slots 140. The magnet of each slot 140 is sized and shaped to fit within the respective slot 140.

The rotor assembly 126 may be configured to receive magnets of different length, as described herein. FIG. 4A and FIG. 5 illustrate the rotor assembly 126 configured with a short magnet 142. FIG. 4B illustrates the rotor assembly 126 configured with a long magnet 143. Each of the configurations of the rotor assembly 126 shown in FIGS. 4A, 4B, and 5 is formed in a common stamping tool.

Referring to FIG. 5, the lamination sheets 134 include at least one group of standard lamination sheets 144, at least one group of recess lamination sheets 146, and at least one tab lamination sheet 148. Generally, the group of standard lamination sheets 144 includes a plurality of standard lamination sheets 144 grouped or stacked together, with each of the lamination sheets 134 disposed within the group of standard lamination sheets 144 being substantially identical. The group of recess lamination sheets 146 includes a plurality of recess lamination sheets 146 grouped or stacked together, with each of the lamination sheets 134 disposed within the group of recess lamination sheets 146 being substantially identical.

The tab lamination sheet 148 is disposed between the group of standard lamination sheets 144 and the group of recess lamination sheets 146. The viewpoint of FIGS. 4A and 4B shows one of the tab lamination sheets 148 with the recess lamination sheets 146 in the background.

The rotor assembly 126 may include multiple groups of standard lamination sheets 144, multiple groups of recess lamination sheets 146, with multiple tab lamination sheets 148, arranged in an alternating relationship. As such, an individual tab lamination sheet 148 is disposed between one group of standard lamination sheets 144 and one group of recess lamination sheets 146.

The tab laminated sheet 148 includes at least two tabs, which have substantially identical shapes, at least initially. The tabs may be individually referred to as a first tab 151 and a second tab 152, and may be created by a tab punch or first and second tab punches. The tabs extend, at least initially, into the apertures of the respective tab lamination sheet 148, and thereby into each of the slots 140 of the rotor assembly 126. Note that the short magnet 142 and the long magnet 143 are shown schematically in FIGS. 4A and 4B, which illustrate the general location of the short magnet 142 and the long magnet 143 before being inserted into the slots 140.

The tabs extend into some form of abutting engagement with the magnets disposed within the respective slot 140, depending on the length of the magnet used. The tab lamination sheet 148 is initially formed such that both the first tab 151 and the second tab 152 are coplanar with the tab lamination sheet 148, and both extend generally radially outward from the central axis once assembled in the laminated stack 136.

Comparison between FIG. 4A and FIG. 4B illustrates how the first tab 151 and the second tab 152 are used to configure the rotor assembly 126 for the short magnets 142, the long magnets 143, or a combination thereof. Furthermore, FIG. 4A and FIG. 4B illustrate how both configurations may be produced by a common stamping tool or common manufacturing assembly. The common stamping tool may be operated with different finishing or punching schedules to form the specific lamination sheets 134, depending on the magnet length required. The lamination sheets 134 created with the common stamping tool may then be aligned or stacked for assembly by a stacking mechanism.

One or more of lamination sheets 134 includes at least an outer stop 154, which may be referred to as a first stop, and may also include an inner stop 156, which may be referred to as a second stop. The outer stop 154 abuts the long magnet 143 and the short magnet 142, and resists radially-outward movement of the magnets. The outer stop 154 and, if needed, the inner stop 156 may be formed in each of the lamination sheets 134, such that they extend substantially the entire axial length of the rotor assembly 126.

As shown in FIG. 4B, as the long magnets 143 are inserted into the slots 140, the long magnets 143 contact the first tab 151 and the second tab 152 and bend the first tab 151 and the second tab 152 out of the slots 140. In so doing, the first tab 151 and the second tab 152 are bent to an approximately parallel relationship relative to the slots 140 and the central axis. The final, bent position of the first tab 151 and the second tab 152 is not illustrated in FIG. 4B, but is similar to that illustrated in FIG. 2.

Because the first tab 151 and the second tab 152 are bent during insertion of the long magnets 143 into the slots 140, the tabs act as springs on a proximal wall of the long magnets 143 and bias a distal wall of the long magnets against an opposing wall—i.e., the radially outward wall in the figures—of the slots 140. The tabs bias the long magnets 143 against the wall of the laminated stack 136 to secure the position of the long magnets 143 relative to the laminated stack 136, such that the rotor assembly 126 does not require any adhesive for bonding the long magnets 143 to the laminated stack. The first tab 151 and the second tab 152 act as mid-magnet retention features.

Referring to FIG. 4B, the apertures of the recess lamination sheets 146 include groove portions to collectively define a plurality of grooves extending parallel with the central axis. A first recess groove 161 is disposed adjacent and directly behind, relative to the direction of insertion of the long magnets 143, the first tab 151. A second recess groove 162 is disposed adjacent and directly behind, relative to the direction of insertion of the long magnets 143, the second tab 152. The first recess groove 161 and the second recess groove 162 are hidden in FIGS. 4A and 4B, but are similar in shape to the grooves 60 illustrated in FIG. 2. The first recess groove 161 and the second recess groove 162 may be created by a recess punch or first and second recess punches.

After insertion of the long magnets 143 within their respective slots 140, the first tab 151 and the second tab 152 of the tab lamination sheet 148 are at least partially disposed—by folding as the long magnets 143 are inserted—within the first recess groove 161 and the second recess groove 162 of the slot 140 defined by the recess lamination sheets 146. Therefore, as illustrated in FIG. 4B, the long magnets 143 overlay and are retained within the slots 140 by two mid-magnet retention features—the first tab 151 and the second tab 152. The long magnets 143 are also retained at radial ends by the outer stop 154 and the inner stop 156.

As illustrated in FIG. 4A, the short magnets 142 overlay and are retained within the slots 140 by only one mid-magnet retention feature—the first tab 151. The short magnets 142 are also retained at one (outer) radial end by the outer stop 154. However, as shown in FIG. 4A, the rotor assembly 126 is configured for the short magnets 142 to use the second tab 152 as an inner stop feature instead of a mid-magnet retention feature.

For use with the short magnets 142, the rotor assembly 126 is produced such that only the first recess groove 161 adjacent the first tab 151 is formed in the slots 140. Therefore, when the short magnets 142 are inserted into the slots 140, the first tabs 151 are at least partially bent or deformed into the first recess groove 161 and apply bias force against the proximal wall of the short magnets 142.

However, the second tabs 152 abut an end of the short magnets 142, as opposed to applying mid-magnet biasing force. There is no second recess groove 162 formed behind the second tabs 152, such that the second tabs 152 cannot similarly be moved out of the slots 140 into any recession or groove. Therefore, the second tabs 152 remain within the slots 140 and act as inner radial retention features adjacent to the ends of the short magnets 142. The inner stops 156 may be formed in the tab lamination sheets 148 solely to maintain manufacturing consistency between lamination sheets 134 formed for the short magnets 142 and the long magnets 143, or may not be formed, in order to save material and weight.

To manufacture rotor assemblies 126 for both the short magnets 142 and the long magnets 143, a common stamping tool selectively forms only some of the features of the recess lamination sheets 146, the tab lamination sheets 148, or both. As viewed in FIG. 4B, to configure the rotor assembly 126 for long magnets 143, the stamping tool activates punching features for the first tab 151 and the second tab 152 on the tab lamination sheets 148. The stamping tool also activates punching features for the first recess groove 161 and the second recess groove 162 on the recess lamination sheets 146.

However, as viewed in FIG. 4A, to configure the rotor assembly 126 for short magnets 142, the stamping tool activates punching features for the first tab 151, the second tab 152, and the first recess groove 161, but does not activate punching features for the second recess groove 162. The common stamping tool may also turn off punching features for the inner stop 156 for the short magnets 142, as the second tab 152 provides the same function.

Therefore, the same tooling produces or creates rotor assemblies 126 configured for both the long magnets 143 and the short magnets 142. The ability to create multiple the rotor assembly 126 for long magnets 143 or for short magnet 142 may improve, for example and without limitation, manufacturing: cost, time, spatial constraints, or flexibility (change-over between different production cycles). The variable processes for configuring the rotor assembly 126 for different magnet lengths may be referred to as finishing or punching schedules.

In one illustrative manufacturing process, different laminations are initially formed with the same features and then finished to create the specific layers required for either the long magnets 143 or the short magnets 142. During a common punching schedule, the first tab 151 and the second tab 152 may be formed on both the tab lamination sheets 148 and the recess lamination sheets 146. To accommodate the short magnets 142, a first finishing schedule forms the first recess grooves 161 on the recess lamination sheets 146, which also removes the first tabs 151 on the recess lamination sheet 146. The first finishing schedule allows the first tabs 151 formed the on the tab lamination layer 148 to fold into the first recess grooves 161, but leaves the second tabs 152 as end stops without a recess into which to deform.

To accommodate the long magnets 143, a second finishing schedule forms the first recess grooves 161 and the second recess grooves 162 on the recess lamination sheets 146, which also removes the first tabs 151 and the second table 152 from the recess lamination sheet 146. The second finishing schedule allows the first tabs 151 and the second tabs 152 formed the on the tab lamination layer 148 to fold into the first recess grooves 161 and the second recess grooves 162, respectively, allowing the long magnets 143 to be retained within the slot 140 by both the first tabs 151 and the second tabs 152.

In some embodiments, the common stamping tool may also form both of the first tabs 151 and the second tabs 152 on the standard lamination sheets 144, and then remove those tabs as needed. This would harmonize the forming of the apertures in all of the laminations. When using the first finishing schedule, for the short magnets 142, all of the first tabs 151 formed on the standard lamination sheets 144 would be removed to allow the short magnets 142 to be inserted into the resulting slot 140. Note that the second tabs 152 formed on the standard lamination sheets 144 may not be needed, such that they may either be removed or left intact by the first finishing schedule. When using the second finishing schedule, for the long magnets 143, all of the first tabs 151 and the second tabs 152 formed on the standard lamination sheets 144 would be removed to allow the long magnets 143 to be inserted into the resulting slot 140.

As partially illustrated in FIG. 5, the rotor assembly 126 configured for the short magnets 142 may also be formed with end-stop tabs in addition to the second tab 152 formed on the tab lamination sheet 148. For example, a plurality of additional tabs 152' may be formed in each of the lamination sheets 134 to create a continuous, or substantially-continuous, end stop for the short magnets 142 along substantially the entire axial length of the slots 140.

Alternatively, several additional tabs 152' may be stacked to form alternating end-stop segments, as shown in FIG. 5, such as by forming the additional tabs 152' on the recess lamination sheets 146, on the standard lamination sheets 144, or both. Therefore, the stamping tool may activate punching features for the second tab 152 on all types of the lamination sheets 134 or on both the tab lamination sheets 148 and the recess lamination sheets 146.

In another embodiment, the lamination sheets 134 may be formed with a single tab (such as the tabs 50 shown in FIGS. 2 and 3) in the apertures 140. The single tab would be positioned at approximately the same location as the second tab 152 and would be used as a mid-magnet retention feature for the long magnets 143 or as an end stop for the short magnets 142. For configurations using the long magnets 143, the single tab could be stamped into each of the lamination sheets 134, then subsequently removed from the standard lamination sheets 144 and from the recess lamination sheets 146 (possibly in combination with forming of a recess groove similar to the groove 160). For configurations using the short magnets 142, the single tab could be stamped into each of the lamination sheets 134, such that the final rotor assembly 126 would include a substantially-continuous single tab protruding into the apertures 140 along the axial length of the rotor assembly 126.

Figure 6A:
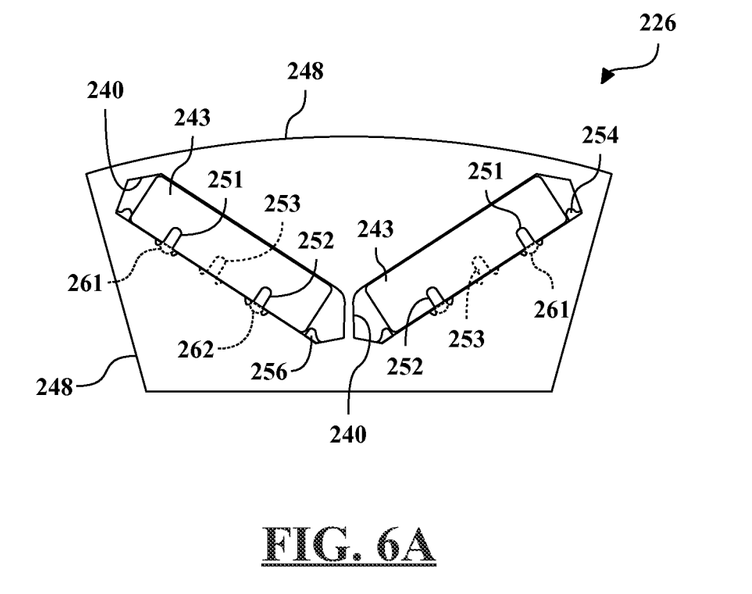
FIG. 6A is a schematic plan view of a portion of a laminated sheet for a rotor assembly configured for multiple magnet lengths, configured with a long magnet.
Figure 6B:
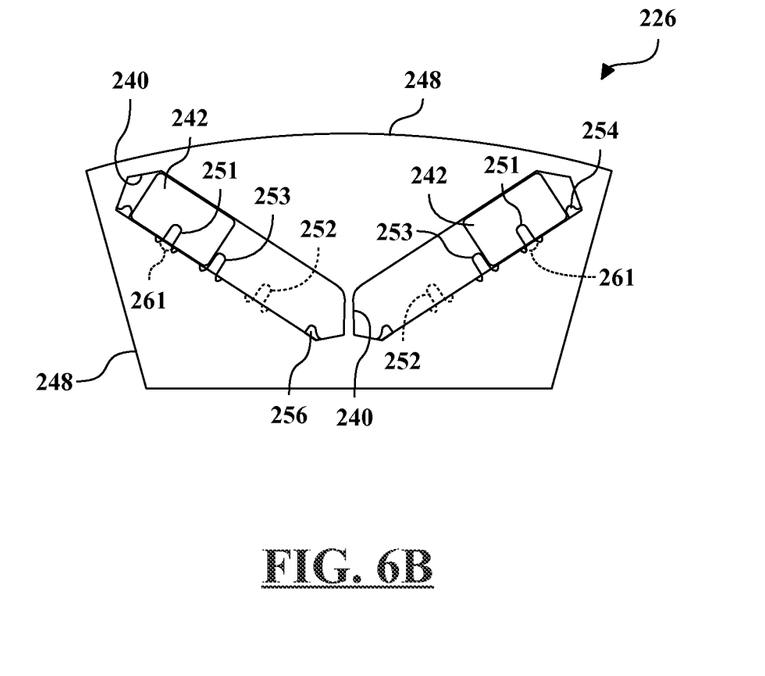
FIG. 6B is a schematic plan view of a laminated sheet related to that shown in FIG. 6A, configured with a very short magnet.

Referring now to FIG. 6A and to FIG. 6B, and with continued reference to FIGS. 1-5, there are shown views and configurations of a rotor assembly 226, which is an IPM rotor configured to be produced with multiple magnet lengths depending on changes to a common stamping tool. The rotor assembly 226 shares many common features with the rotor assembly 126, and description of shared features and functions may be omitted from the description of the rotor assembly 226.

FIG. 6A shows a plan view of a portion of the rotor assembly 226, illustrating configuration for long magnets. FIG. 6B shows a plan view of a portion of the rotor assembly 226, illustrating configuration for very short magnets.

The rotor assembly 226 includes a plurality of lamination sheets (not separately numbered) that form a core of the rotor assembly 226. When the lamination sheets are assembled and aligned along a central axis (not shown), the apertures in the lamination sheets are aligned with each other to define one or more slots 240, which extend parallel with the central axis.

The rotor assembly 226 includes a plurality of magnets, one or more of which is disposed within each of the slots 240. The rotor assembly 226 is configured to receive magnets of different length, as described herein. FIG. 6B illustrates the rotor assembly 226 configured with a very short magnet 242. FIG. 6A illustrates the rotor assembly 226 configured with a long magnet 243. Note that the very short magnet 242 and the long magnet 243 are shown schematically in FIGS. 6A and 6B, which illustrate the general location of the short magnet 242 and the long magnet 243 before being inserted into the slots 240.

Each of the configurations of the rotor assembly 226 shown in FIGS. 6A and 6B is formed in a common stamping tool. Note that, relative to the respective assemblies, the long magnets 143 of the rotor assembly 126 shown in FIG. 4B are substantially the same size as the long magnets 243 of the rotor assembly 226 shown in FIG. 6A. The very short magnets 242 of FIG. 6B are less than approximately 40% of the length of the long magnets 243 of FIG. 6A.

The lamination sheets of the rotor assembly 226 include at least one group of standard lamination sheets (not shown or numbered), at least one group of recess lamination sheets (not shown or numbered), and at least one tab lamination sheet 248. The tab lamination sheet 248 is generally disposed between the group of standard lamination sheets and the group of recess lamination sheets. The viewpoint of FIGS. 6A and 6B shows one of the tab lamination sheets 248 with the recess lamination sheets in the background.

The tab laminated sheet 248 selectively includes a plurality of tabs, which are substantially identical, at least initially. The tabs may be individually referred to as a first tab 251, a second tab 252, and a third tab 253. The tabs extend, at least initially, into the apertures of the respective tab lamination sheet 248, and thereby into each of the slots 240 of the rotor assembly 226. The selectively formed tabs extend into abutting engagement with the magnets disposed within the respective slot 240, depending on the length of the magnet used.

The recess lamination sheets include groove portions to collectively define a plurality of grooves extending parallel with the central axis. A first recess groove 261 and a second recess groove 262 are selectively formed adjacent and directly behind, relative to the direction of insertion of the long magnets 243, the first tab 251 and the second tab 252.

Comparison between FIG. 6A and FIG. 6B illustrates how the first tab 251, the second tab 252, and the third tab 253 are used to configure the rotor assembly 226 for the very short magnets 242, the long magnets 243, or a combination thereof. One or more of the lamination sheets includes at least an outer stop 254, and may also include an inner stop 256. The outer stop 254 abuts the long magnet 243 and the very short magnet 242, and resists radially-outward movement thereof Note that, unlike the configurations of the rotor assembly 126 shown in FIGS. 4A and 4B, in the configurations of the rotor assembly 226 shown in FIGS. 6A and 6B, not all of the tabs are formed for both magnet sizes. As shown in FIG. 6A, for the long magnets 253, only the first tab 251 and the second tab 252 are formed and extend into the slot 240. Although the third tab 253 is not formed, the relative position of the second tab 252 is illustrated in FIG. 6A with dashed lines.

Therefore, as the long magnets 243 are inserted into the slots 240, the long magnets 243 contact the first tabs 251 and the second tabs 252 and bend the first tabs 251 and the second tabs 252 out of the slots 240. In so doing, the first tabs 251 and the second tabs 252 are bent to an approximately parallel relationship relative to the slots 240 and the central axis. The first tabs 251 and the second tabs 252 nest within the first recess groove 261 and the second recess groove 262. Therefore, as illustrated in FIG. 6A, the long magnets 243 overlay and are retained within the slots 240 by the first tabs 251 and the second tabs 252.

As illustrated in FIG. 6B, the very short magnets 242 overlay and are retained within the slots 240 by only one mid-magnet retention feature—the first tab 251. Furthermore, for the very short magnets 242, only the first tab 251 and the third tab 253 are formed on the tab lamination sheets 248. Although the second tab 252 is not formed for the very short magnets 242, the relative position of the second tab 252 is illustrated in FIG. 6B with dashed lines.

The very short magnets 242 are also retained at their outer end by the outer stop 254. However, as shown in FIG. 6B, the rotor assembly 226 is configured for the very short magnets 242 to use the third tab 253 as an inner stop feature.

For use with the very short magnets 242, only the first recess groove 261 adjacent the first tab 251 is formed in the slots 240. Therefore, when the very short magnets 242 are inserted into the slots 240, the first tabs 251 are bent into the first recess groove 261 and apply bias force against the very short magnets 242.

However, there is no recess groove formed behind the third tab 253, such that the third tab 253 cannot similarly be moved out of the slot 240. Therefore, the third tabs 253 remain within the slots 240 and act as inner radial retention features adjacent to the ends of the very short magnets 242. Alternatively, the third tabs 253 may be formed on each lamination sheet, as opposed to simply the tab lamination sheets 248, such that third tabs 253 form a substantially continuous end stop along the axial length of the rotor assembly 226. The inner stops 256 may be formed in the tab lamination sheets 248 solely to maintain manufacturing consistency between lamination sheets formed for the very short magnets 242 and the long magnets 243.

To manufacture rotor assemblies 226 for both the very short magnets 242 and the long magnets 243, a common stamping tool selectively forms only some of the features of the recess lamination sheets, the tab lamination sheets 248, or both. As viewed in FIG. 6A, to configure the rotor assembly 226 for long magnets 243, the stamping tool activates punching features for the first tab 251 and the second tab 252 and for the first recess groove 261 and the second recess groove 262, but does not activate punching features for the third tab 253.

However, as viewed in FIG. 6B, to configure the rotor assembly 226 for very short magnets 242, the stamping tool activates punching features for the first tab 251, the third tab 253, and the first recess groove 261, but does not activate punching features for the second tab 252 and the second recess groove 262. The common stamping tool may also turn off punching features for the inner stop 256 for the very short magnets 242, as the second tab 252 provides the same function. Therefore, the same tooling produces rotor assemblies 226 configured for both the long magnets 243 and the very short magnets 242.

Note that some methods for selectively producing the first tab 251, the second tab 252, and the third tab 253 may include initially forming all three elements on the tab lamination sheets 248 and then removing elements that will not be used. Alternatively, the unneeded tab—such as the third tab 253 for the long magnets 243—may not be formed at all.

Furthermore, some methods for selectively producing the first tab 251, the second tab 252, and the third tab 253 may include forming each tab on every lamination sheet of the rotor assembly 226. For example, the first tabs 251 and the second tabs 252 may be formed on each of the recess lamination sheets and then removed as the first recess groove 261 and the second recess groove 262 are subsequently formed.

Some configurations may include forming each tab on every lamination sheet and then removing unneeded tabs by forming the coincident recess on any lamination sheet not needing the formed tab. Such a process would result in un-used recess grooves, but would simplify the production process and the common stamping tool be removing any difference between standard lamination sheets and recess lamination sheets formed for short magnets and long magnets.

The detailed description and the drawings or figures are supportive and descriptive of the subject matter discussed herein. While some of the best modes and other embodiments for have been described in detail, various alternative designs, configurations, and embodiments exist.

The invention claimed is:

1. A rotor assembly for an electric machine having a central axis, the rotor assembly comprising:
  a plurality of standard lamination sheets;
  at least one tab lamination sheet;
  a plurality of recess lamination sheets, disposed opposite the tab lamination sheet from the standard lamination sheets;
    wherein each of the standard lamination sheets, the tab lamination sheets, and the recess lamination sheets defines an aperture, and
    wherein the plurality of lamination sheets are disposed adjacent each other to define a laminated stack, such that the apertures align to define a slot extending substantially parallel with the central axis;
  a magnet disposed within the slot;
  a first tab formed on the tab lamination sheet, wherein the first tab extends into the slot and into abutting engagement with a proximal surface of the magnet, such that the first tab biases a distal surface of the magnet against the slot to secure the magnet in position relative to the laminated stack;
  a first recess groove defined in the recess lamination sheets axially adjacent to the first tab of the tab lamination sheet, wherein the first tab is at least partially disposed within the first recess groove; and
  a second tab formed on the tab lamination sheet and extending substantially perpendicularly into the slot relative to the slot, wherein the second tab abuts an end of the magnet but does not bias the magnet against the slot, and wherein the recess lamination sheets do not define a groove adjacent the second tab.

2. A rotor assembly as set forth in claim 1, wherein the second tab is formed on the standard lamination sheets and the on the recess lamination sheets, such that the second tabs are continuous throughout the slot.

3. A rotor assembly as set forth in claim 2, further comprising:
  a first stop formed on the standard lamination sheets, the tab lamination sheets, and the recess lamination sheets, and extending into the slot, such that the first stops are continuous throughout the slot, wherein the first stop is shorter than the first tab and the second tab.

4. A method of manufacturing rotor assemblies, comprising:
  forming a plurality of standard lamination sheets, each having an aperture;
  forming a plurality of tab lamination sheets, each having:
    an aperture;
    a first tab extending into the aperture; and
    a second tab extending into the aperture;
  forming a plurality of recess lamination sheets, each having:
    an aperture;
    a first tab extending into the aperture; and
    a second tab extending into the aperture;

activating a first finishing schedule, including:
    removing the first tabs of the recess lamination sheets and forming a first recess groove on the recess lamination sheets at the location of the first tabs; and
    stacking the tab lamination sheets with the recess lamination sheets, such that the first tabs of the tab lamination sheets are axially aligned with the first recess grooves of the recess lamination sheets, and the second tabs of the tab lamination sheets are axially aligned with the second tabs of the recess lamination sheets; and
activating a second finishing schedule, including:
    removing the first tabs of the recess lamination sheets and forming a first recess groove on the recess lamination sheets at the location of the first tabs;
    removing the second tabs of the recess lamination sheets and forming a second recess groove on the recess lamination sheets at the location of the first tabs; and
    stacking the tab lamination sheets with the recess lamination sheets, such that the first tabs of the tab lamination sheets are axially aligned with the first recess grooves of the recess lamination sheets, and the second tabs of the tab lamination sheets are axially aligned with the second recess grooves of the recess lamination sheets.

5. The method of claim 4, further comprising:
inserting a short magnet after activating the first finishing schedule, such that the first tabs of the tab lamination sheets are deformed into the first recess groove of the recess lamination sheets.

6. The method of claim 5, further comprising:
inserting a long magnet, which is at least twenty-five percent longer than the short magnet, after activating the second finishing schedule, such that the first tabs of the tab lamination sheets are deformed into the first recess groove of the recess lamination sheet and the second tabs of the tab lamination sheets are deformed into the second recess groove of the recess lamination sheet.

7. The method of claim 6, further comprising:
forming a first stop on the standard lamination sheets, the tab lamination sheets, and the recess lamination sheets, such that the first stops are continuous throughout the slot, wherein the first stop is shorter than the first tabs and the second tabs.

8. The method of claim 7, further comprising:
wherein forming the standard lamination sheets includes forming a first tab extending into the aperture and a second tab extending into the aperture;
wherein activating the first finishing schedule includes removing the first tabs of the standard lamination sheets; and
wherein activating the second finishing schedule includes removing the first tabs of the standard lamination sheets and removing the second tabs of the standard lamination sheets.

9. A system for producing a plurality of lamination sheets for a rotor assembly having a central axis, the system comprising:
an aperture punch configured to form an aperture in each of the lamination sheets;
a first tab punch configured to selectively form a first tab in the lamination sheets;
a first recess punch configured to selectively remove the first tab from the lamination sheets and to form a first recess in place of the first tab;
a second tab punch configured to selectively form a second tab in the lamination sheets;
a second recess punch configured to selectively remove the second tab from the lamination sheets and to form a second recess in place of the second tab; and
a stacking mechanism configured to axially align the selectively-formed first tabs and first recesses and to axially align the selectively-formed second tabs and second recesses,
wherein the first recess punch and the second recess punch are configured to operate on different schedules, such that the produced rotor assembly may have consecutive first tabs, intermittent first tabs and first recesses, consecutive second tabs, or intermittent second tabs and second recesses.

* * * * *